(12) United States Patent
Thimmappa et al.

(10) Patent No.: US 11,042,418 B2
(45) Date of Patent: Jun. 22, 2021

(54) CLASSIFICATION BASED AUTOMATED INSTANCE MANAGEMENT

(71) Applicant: ServiceNow, Inc., Santa Clara, CA (US)

(72) Inventors: Mohan Thimmappa, Redmond, WA (US); Abbas Guvenilir, Seattle, WA (US); Maalika Tadinada, Issaquah, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/249,659

(22) Filed: Jan. 16, 2019

(65) Prior Publication Data
US 2019/0220325 A1    Jul. 18, 2019

Related U.S. Application Data

(63) Continuation of application No. 15/421,941, filed on Feb. 1, 2017, now Pat. No. 10,191,781, which is a
(Continued)

(51) Int. Cl.
*G06F 9/50* (2006.01)
*H04L 29/12* (2006.01)
(Continued)

(52) U.S. Cl.
CPC .......... *G06F 9/5083* (2013.01); *G06F 9/5072* (2013.01); *G06F 16/285* (2019.01);
(Continued)

(58) Field of Classification Search
CPC .... G06F 9/5083; G06F 16/285; G06F 9/5072; G06F 2209/508; H04L 67/10; H04L 61/2007
See application file for complete search history.

(56) References Cited

U.S. PATENT DOCUMENTS 7,020,706 B2    3/2006  Cates
7,272,615 B2    9/2007  Li et al.
(Continued)

FOREIGN PATENT DOCUMENTS

EP    1585031 A1    10/2005
WO    2010144329 A1    12/2010
(Continued)

OTHER PUBLICATIONS

"ServiceNow Cloud Provisioning", ServiceNow Datasheets, Nov. 15, 2014, XP055255142, retrieved from the Internet: url;hhttp://web.archive.org/web/20141116132956/https://www.servicenow.com/content/dam/servicenow/documents/datasheets/ds-cloud-provisioning.pdf (Retrieved in Mar. 3, 2016).
(Continued)

*Primary Examiner* — Sisley N Kim
(74) *Attorney, Agent, or Firm* — Fletcher Yoder, P.C.

(57) ABSTRACT

Systems, apparatuses, and methods for classification based automated instance management are disclosed. Classification based automated instance management may include automatically commissioning an application instance based on a plurality of classification metrics, and automatically monitoring the application instance based on the plurality of classification metrics. Automatically monitoring the application instance may include identifying a plurality of instance monitoring policies associated with the application instance based on the plurality of classification metrics. Automatically monitoring the application instance may include automatically suspending the application instance plurality of instance monitoring policies and automatically decommissioning the application based on the plurality of instance monitoring policies.

20 Claims, 8 Drawing Sheets

Related U.S. Application Data continuation of application No. 14/984,230, filed on Dec. 30, 2015, now Pat. No. 9,575,812.

(60) Provisional application No. 62/098,470, filed on Dec. 31, 2014.

(51) Int. Cl.
*H04L 29/08* (2006.01)
*G06F 16/28* (2019.01)

(52) U.S. Cl.
CPC .......... *H04L 61/2007* (2013.01); *H04L 67/10* (2013.01); *G06F 2209/508* (2013.01)

(56) References Cited

U.S. PATENT DOCUMENTS

| | | |
|---|---|---|
| 7,640,877 B1 | 1/2010 | Brown et al. |
| 7,716,353 B2 | 5/2010 | Golovinsky |
| 7,725,559 B2 | 5/2010 | Landis et al. |
| 7,769,718 B2 | 8/2010 | Murley |
| 7,925,981 B2 | 4/2011 | Pourheidari |
| 8,285,827 B1 | 10/2012 | Reiner et al. |
| 8,402,127 B2 | 3/2013 | Solin |
| 8,612,408 B2 | 12/2013 | Trinon |
| 8,738,972 B1 | 5/2014 | Barkman et al. |
| 8,763,007 B1* | 6/2014 | Hushyar .............. H04L 67/10 719/313 |
| 8,832,652 B2 | 9/2014 | Mueller |
| 9,065,783 B2 | 6/2015 | Ding |
| 9,098,322 B2 | 8/2015 | Apte |
| 9,122,552 B2 | 9/2015 | Whitney |
| 9,317,327 B2 | 4/2016 | Apte |
| 9,363,252 B2 | 6/2016 | Mueller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,805,322 B2 | 10/2017 | Kelkar |
| 2001/0042139 A1 | 11/2001 | Jeffords et al. |
| 2002/0073089 A1 | 6/2002 | Schwartz et al. |
| 2002/0178214 A1 | 11/2002 | Brittenham et al. |
| 2003/0093436 A1 | 5/2003 | Brown et al. |
| 2004/0010602 A1 | 1/2004 | Van Vleck et al. |
| 2004/0015511 A1 | 1/2004 | Seefeldt et al. |
| 2005/0177616 A1 | 8/2005 | Addington et al. |
| 2008/0140759 A1 | 6/2008 | Conner et al. |
| 2009/0204612 A1 | 8/2009 | Keshavarz-Nia et al. |
| 2010/0205304 A1 | 8/2010 | Chaturvedi et al. |
| 2012/0047239 A1 | 2/2012 | Donahue et al. |
| 2013/0067494 A1* | 3/2013 | Srour .................. G06F 9/485 719/318 |
| 2013/0297802 A1* | 11/2013 | Laribi .................. H04L 47/80 709/226 |
| 2014/0215466 A1 | 7/2014 | Khasnabish |
| 2014/0258446 A1 | 9/2014 | Bursell |
| 2015/0058467 A1 | 2/2015 | Douglas et al. |
| 2015/0278245 A1* | 10/2015 | Sagar ................ G06F 16/9574 707/610 |
| 2015/0333982 A1* | 11/2015 | Kang ................ G06F 15/0225 709/224 |

FOREIGN PATENT DOCUMENTS

| | | |
|---|---|---|
| WO | 2012022585 A1 | 2/2012 |
| WO | 2013190180 A1 | 12/2013 |

OTHER PUBLICATIONS

Johannes Kirschnick et al.;, "Toward an architecture for the automated provisioning of cloud services", IEEE Communications Magazine, IEEE Service Center, Piscataway, US, vol. 48, No. 12, Dec. 1, 2010, pp. 124-131.

"Cloud Provisioning—ServiceNow Wiki", ServiceNow Product Documentation, Nov. 15, 2014, XP055255186, retrieved from the internet: URL:http://web.archive.org/web/20141115213756/http://wiki.servicenow.com/index.php?title=Cloud_Provisioning (retrieved on Mar. 4, 2016).

Anonymous: "Overview—VM Archiving", COMMVAULT V10 documentation, Jul. 3, 2014, XP0555527917, [retrieved from the internet: Http://web.archive.org/web/20140703005727/http://documentation.commvault.com:80/commvault/v10/article?p=products/vs_vmware/vm_archiving/overview_vm_archiving.htm—retrieved on Nov. 28, 2018].

* cited by examiner

CLASSIFICATION BASED AUTOMATED INSTANCE MANAGEMENT

CROSS-REFERENCE TO RELATED APPLICATION

This application is a continuation of U.S. application Ser. No. 15/421,941 filed Feb. 1, 2017, entitled "Classification Based Automated Instance Management," which is a continuation of Ser. No. 14/984,230 filed Dec. 30, 2015, entitled "Classification Based Automated Instance Management," now U.S. Pat. No. 9,575,812, and which claims the benefit of U.S. Provisional Application No. 62/098,470 filed Dec. 31, 2014, entitled, "Classification Based Automated Instance Management," all of which are herein incorporated by reference.

BACKGROUND

The present disclosure relates in general to techniques and devices for managing cloud based computing system instances.

Cloud computing relates to the sharing of computing resources that are typically accessed via the Internet. A cloud computing infrastructure typically includes a large number of servers that are configured to execute various programs, such as application servers, web servers, and/or database servers. Accordingly, classification based automated instance management would be advantageous.

SUMMARY

One implementation of the disclosure is an apparatus for automatically commissioning and decommissioning a computer-instantiated application instance comprising a processor configured to execute instructions stored in a memory to provide a request at a communication input to commission an application instance, identify the request to commission the application instance, the request indicating a classification metric for the application instance, automatically commission the application instance based on the classification metric, utilize data received at the communication input to automatically monitor the application instance based on the classification metric, and automatically decommissioning the application based on the classification metric Another implementation of the disclosure is an apparatus for classification based automated instance management, comprising a processor configured to execute instructions stored in a memory to identify a request to commission an application instance, the request indicating a plurality of classification metrics for the application instance, automatically commission the application instance based on the plurality of classification metrics, and automatically monitor the application instance based on the plurality of classification metrics by identifying a plurality of instance monitoring policies associated with the application instance based on the plurality of classification metrics; and identifying an approved extension for the application instance based on the plurality of instance monitoring policies, wherein monitoring the application instance comprises on a condition that an approved extension is identified, extending the application instance based on the plurality of instance monitoring policies, and on a condition that an approved extension is unidentified, determining whether the application instance is in an active state or a suspended state based, wherein monitoring the application instance comprises on a condition that the application instance is in an active state, identifying an expiration date for the application instance based on the plurality of instance monitoring policies, wherein monitoring the application instance comprises on a condition that the expiration date is identified, identifying an expiration milestone for the application instance based on the plurality of instance monitoring policies, wherein monitoring the application instance comprises on a condition that the expiration milestone is identified, generating and sending an expiration milestone notification for the application instance based on the plurality of instance monitoring policies and the identified expiration milestone; and on a condition that the expiration milestone is unidentified, monitoring the application instance comprises determining whether a duration for the application instance has expired based on the plurality of instance monitoring policies, and on a condition that the duration for the application instance has expired, suspending the application instance based on the plurality of instance monitoring policies, and on a condition that the expiration date is unidentified, generating the expiration date for the application instance based on the plurality of instance monitoring policies, and sending an instance expiration notification indicating that the instance will be suspended after the expiration date; and on a condition that the application instance is in a suspended state, determining whether a suspension period for the application instance has expired based on the plurality of instance monitoring policies, and on a condition that the suspension period for the application instance has expired, decommissioning the application instance based on the plurality of instance monitoring policies.

Another implementation of the disclosure is a computer-implemented method for automatically commissioning and decommissioning an application instance comprising receiving at a communication input of a processor a request to commission an application instance on a computer, identifying, by the processor, the request to commission the application instance, the request structured to include a classification metric for the application instance, automatically commissioning, by the processor, the application instance based on the classification metric, automatically monitoring by the processor, utilizing data received at the communication input, the application instance running on the computer based on the classification metric, and automatically decommissioning by the processor the application based on the classification metric.

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

BRIEF DESCRIPTION OF THE DRAWINGS

The description herein makes reference to the accompanying drawings wherein like reference numerals refer to like parts throughout the several views. Various aspects of this disclosure may be better understood upon reading the following detailed description and upon reference to the drawings in which.

DETAILED DESCRIPTION OF SPECIFIC EMBODIMENTS

Figure 1:
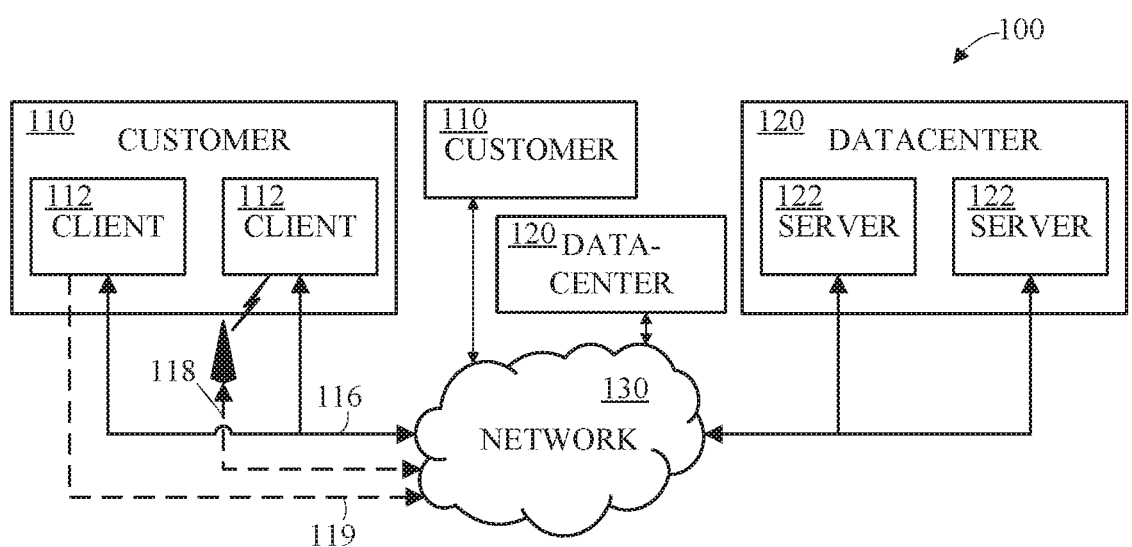
FIG. 1 is a block diagram of a networked distributed or cloud computing system in which the teachings herein may be implemented.

An application instance, such as a web site or service, in a cloud computing system may be instantiated on one or more physical devices, one or more virtual device, or a combination of physical and virtual devices. For example, an application instance may include a web server and a database server dedicated to the application and executing on a virtual machine, which may be hosted on a physical server. In another example, multiple physical servers may be dedicated to an application instance. Each active instance may utilize various cloud computing system resources, such as processors, or processor cycles, random access memory (RAM), storage or disk space, network address space, network communication bandwidth, and the like. The operational expectations, such as response time, availability, maximum concurrent use, and the like, for each instance may vary from instance to instance, and may be subject to contractual obligations, such as a service level agreement (SGA). Managing instances may utilize significant human resources.

Instance management may include monitoring and controlling instance use and lifecycle, which may include commissioning or provisioning an instance, maintaining or monitoring an instance, and decommissioning an instance and reclaiming associated resources. However, existing instance management systems may not efficiently and automatically manage application instances, may inefficiently allocate cloud computing system resources, may inefficiently utilize human resources, and may not efficiently comply with operation expectations.

Computing resources of cloud computing infrastructure may be allocated, for example, using a multi-tenant or a single-tenant architecture. Under a multi-tenant architecture, installations or instantiations of application, database, and/or other software application servers may be shared amongst multiple customers. For example, a single web server (e.g., a unitary Apache installation), application server (e.g., unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customerid field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an example implementation, a customer instance is composed of four web server instances, four application server instances, and two database server instances. As previously described each of these server instances may be located on different physical servers and each of these server instances may share resources of the different physical servers with a number of other server instances associated with other customer instances. The web, application, and database servers of the customer instance can be allocated to two different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server can replicate data to the secondary database server. The cloud computing infrastructure can be configured to direct traffic to the primary pair of web servers which can be configured to utilize the primary pair of application servers and primary database server respectively. In a failure scenario, the secondary servers may be converted to primary servers.

The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom UI elements that are used to customize the appearance and operation of the customer instance. In some implementations, the application servers can include web server functionality and the web servers can be omitted.

In an alternative implementation, a customer instance may include only two application servers and one database server. In a given cloud infrastructure system, different implementations of customer instances may be used for different customer instances at the same time. Other configurations and implementations of customer instances may also be used.

The proper allocation of computing resources of a physical server to an instance of a particular software server, such as a database server instance, can be important to the efficient and effective functioning of the cloud infrastructure. If too few resources are allocated, performance of the services provided to the customer using the database server may be degraded. If too many resources are allocated, computing resources may be wasted as the extra allocated resources may not meaningfully increase the performance of the services provided to the customer. Repeated over allocation of computing resources may require that additional server hardware be purchased to satisfy the over allocation, resulting in a greater than necessary cost for providing the cloud infrastructure. In current systems, the amount of possible RAM may be constrained per physical server and the utilization of RAM may be relatively higher than other available computing resources, such as processing cycles (e.g., CPU) and storage (e.g., solid state and magnetic hard disks). Thus, it may be advantageous to more precisely allocate the amount of RAM to each database server instance due to the relative scarcity of RAM resources.

The amount of memory used by a database server may be fixed once the database server is provisioned or created. In this case, in order to change an amount of memory allocated to a database server, a new database server instance may be created and the contents of the existing database server transferred to the new database server instance. This process may be controlled by a database instance move system which may be provided with an identifier of a database server instance and a desired size for the database server instance in order to move the instance. In certain implementations, the move system can identify a server that the database server instance can be moved to based on certain criteria, such as available free resources, location, or other known information. A customer notification can be provided and the provisioning of the new database server instance with the desired size can be performed automatically followed by the copying of database server data to the new database server instance, switching configuration settings so that users are directed to the new database server instance and retiring the original database server after a pre-determined time (e.g., 2 days) to reclaim system resources, such as RAM, allocated to the original database server. In an alternative implementation, the amount of memory used by a database server instance can be adjusted in certain circumstances. For example, the amount of memory may be increased only to the extent that additional memory is available on the physical server for allocation.

A database instance can be allocated RAM and storage, such as non-volatile storage, which can be accessed and processed using a CPU. The RAM can include a buffer pool, key cache, query cache, and other memory allocations. The buffer pool can be used to cache table and index database pages from the storage. Query cache can store some or all previous queries to the database to optimize processing of later similar or same queries. Key cache can be used to store portions of database tables that may be accessed more often than other portions. Each of buffer pool, query cache, and key cache may be allocated a certain portion of the RAM. The size of each allocation may differ, for example, the buffer pool may be allocated more RAM than query cache and key cache. Other allocations can include other buffers or data structures used in the operation of the database instance. The buffers and data structures used in an implementation of a database instance may vary and may include less or additional buffers than described here.

The storage an include storage of table data including tables. The number of tables can vary and can number in the thousands, for example. The storage can also include other storage for storing other data used by the database instance, for example, configuration data, index data, and other information used in the operation of the database instance.

Classification based automated instance management may reduce instance management human resource utilization, may improve the allocation, utilization, and reclamation of cloud computing system resources, and may improve compliance with operation expectations, by performing instance management automatically based on instance classification information.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
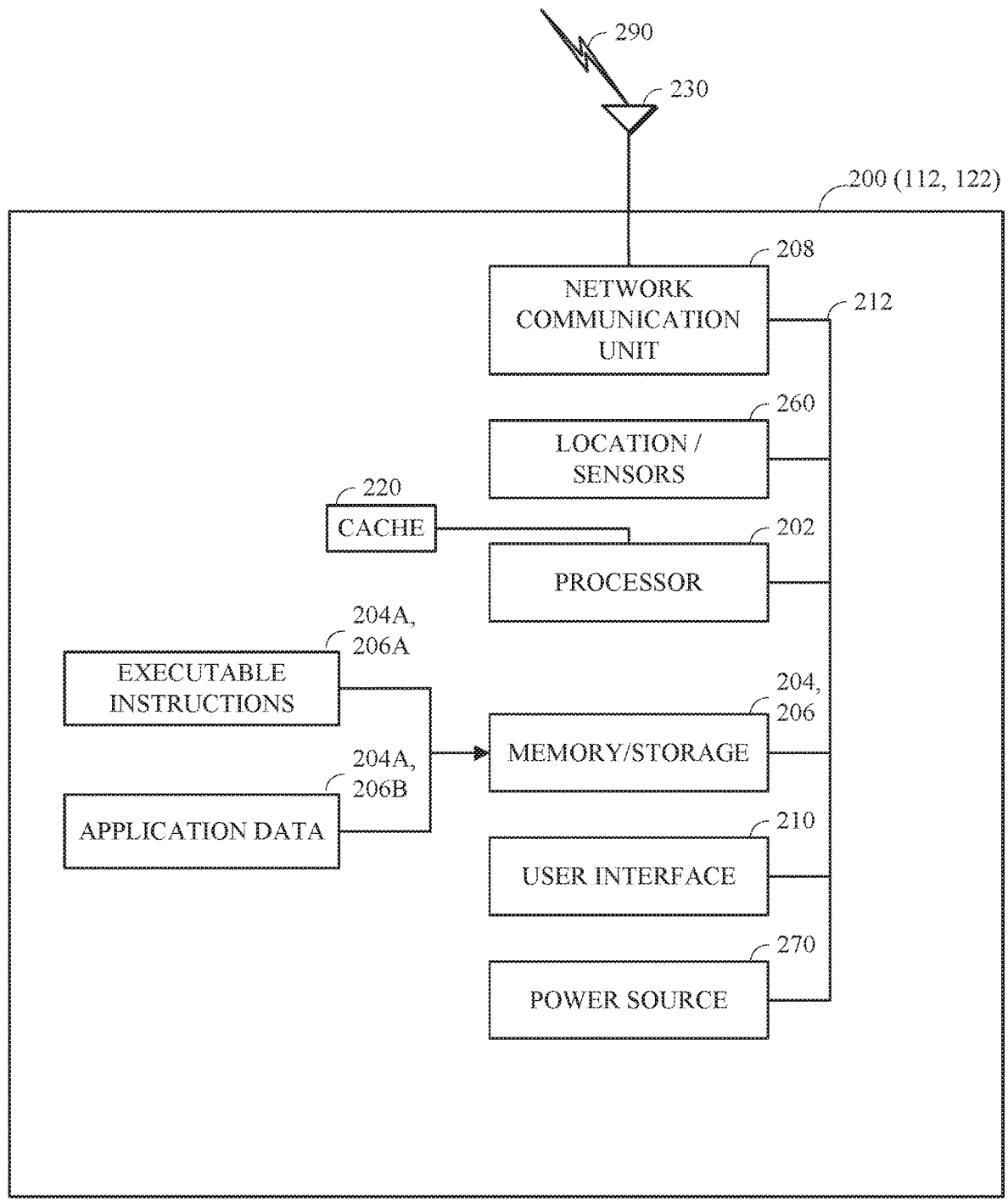
FIG. 2 is a block diagram of an example internal configuration of a computing device, such as a computing device of the computing system as shown in FIG. 1

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3A:
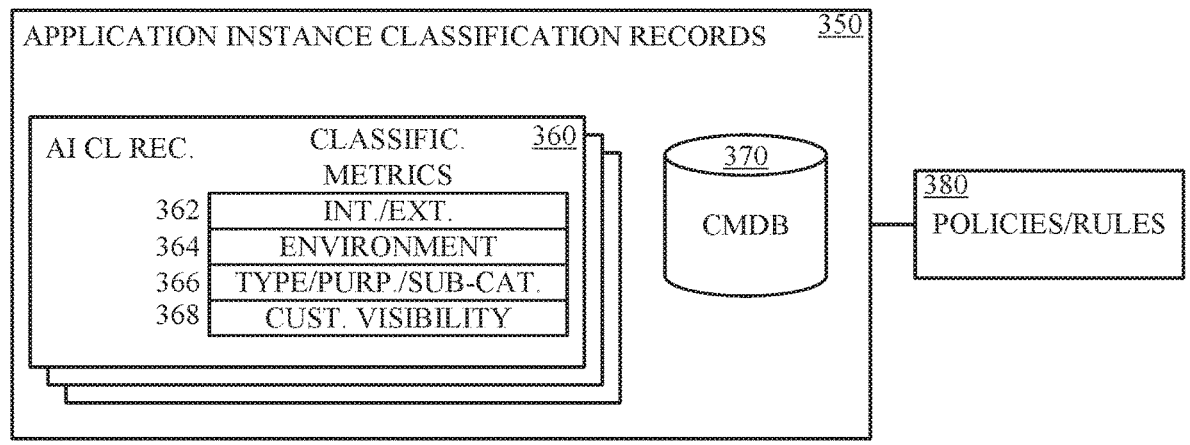
FIG. 3A is a block diagram illustrating primary components of the classification based automated instance management system in accordance with this disclosure.

FIG. 3A is a block diagram illustrating an example of the basic components of a classification based automated instance management system in accordance with this disclosure. Application instances may be classified based on one or more ontological classification metrics, which may be hieratically organized. Information representing aspects of an instance, which may include classification metrics, may be stored as records 360 in a classification based automated instance management database or configuration file 350, which may include a configuration management database (CMDB) 370. The classification based automated instance management data may define classification metrics, and may describe relationships, such as hierarchical relationships, between the classification metrics. For example, the classification based automated instance management data may include a first record defining a first classification metric, a second record defining a second classification metric, and a third record indicating that the sub-hierarchy of the first classification metric includes the second classification metric.

Classification based automated instance management may include using one or more policies or rules 380 to automatically manage application instances. For example, the classification based automated instance management system may include information indicating automation policies which may be stored as records in the classification based automated instance management database. In some implementations, one or more policies may represent an agreement, such as a service level agreement (SLA). Classification based automated instance management policies may be associated with one or more classification metrics and the classification based automated instance management data may include records describing the associations between classification metrics and the policies. For example, an instance may be associated with a customer account, and the classification based automated instance management system may include records, or combinations of records, representing policies corresponding to the customer account. In some implementations, classification based automated instance management policies may be associated with a user, a user role, a user group, or a combination thereof.

Figure 3B:
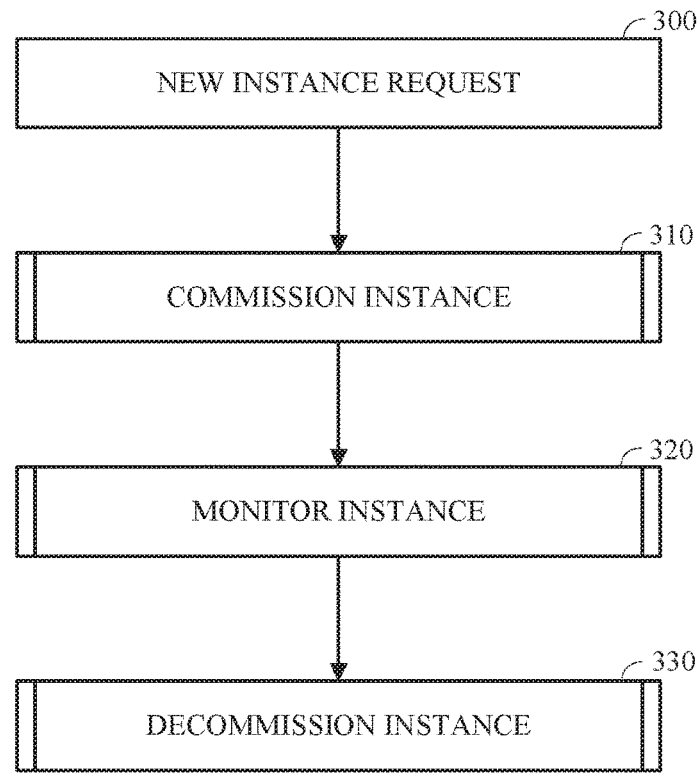
FIG. 3B is a flowchart illustrating an example of classification based automated instance management in accordance with this disclosure.

FIG. 3B is a flowchart illustrating an example of classification based automated instance management. In some implementations, classification based automated instance management may include generating a request to commission an instance at 300, commissioning the instance at 310, monitoring the instance at 320, decommissioning the instance at 330, or a combination thereof.

A request to commission an instance may be generated at 300. For example, a request to commission an instance may be generated based on user input via a user interface. In some implementations, a request to commission an instance may be generated in response to user input selecting parameters for the instance and submitting the request via a user interface, such as a web page. In some implementations, the user interface may have an ontological association. For example, an internal instance may be commissioned using an internal instance request interface, and an external instance may be commissioned using an external instance request interface.

A request to commission an instance may include parameters for the instance, such as an ontology indicator, environment indicator, a type indicator, a visibility indicator, an owner identifier, an assignment group identifier, a name, a comment, a target datacenter, a target address, such as a universal resource locator (URL), or any other information relevant to managing the instance. An environment indicator may indicate whether the request is for a production instance, a sub-production instance, or a demonstration instance. A type or sub-category indicator may indicate a type associated with the instance. For example, a sub-category indicator may indicate that the instance is a training instance, a development instance, a marketing instance, a sales instance, or any other purpose or use for the instance. The customer facing indicator may indicate whether the instance will include one or more components that may be directly available to an external customer, such as a user interface accessible by the customer. An owner indicator may identify a user, a user role, a group, or an organization as an owner of the instance. For example, the request may be generated in response to user input and the owner may be the user.

Figure 4:
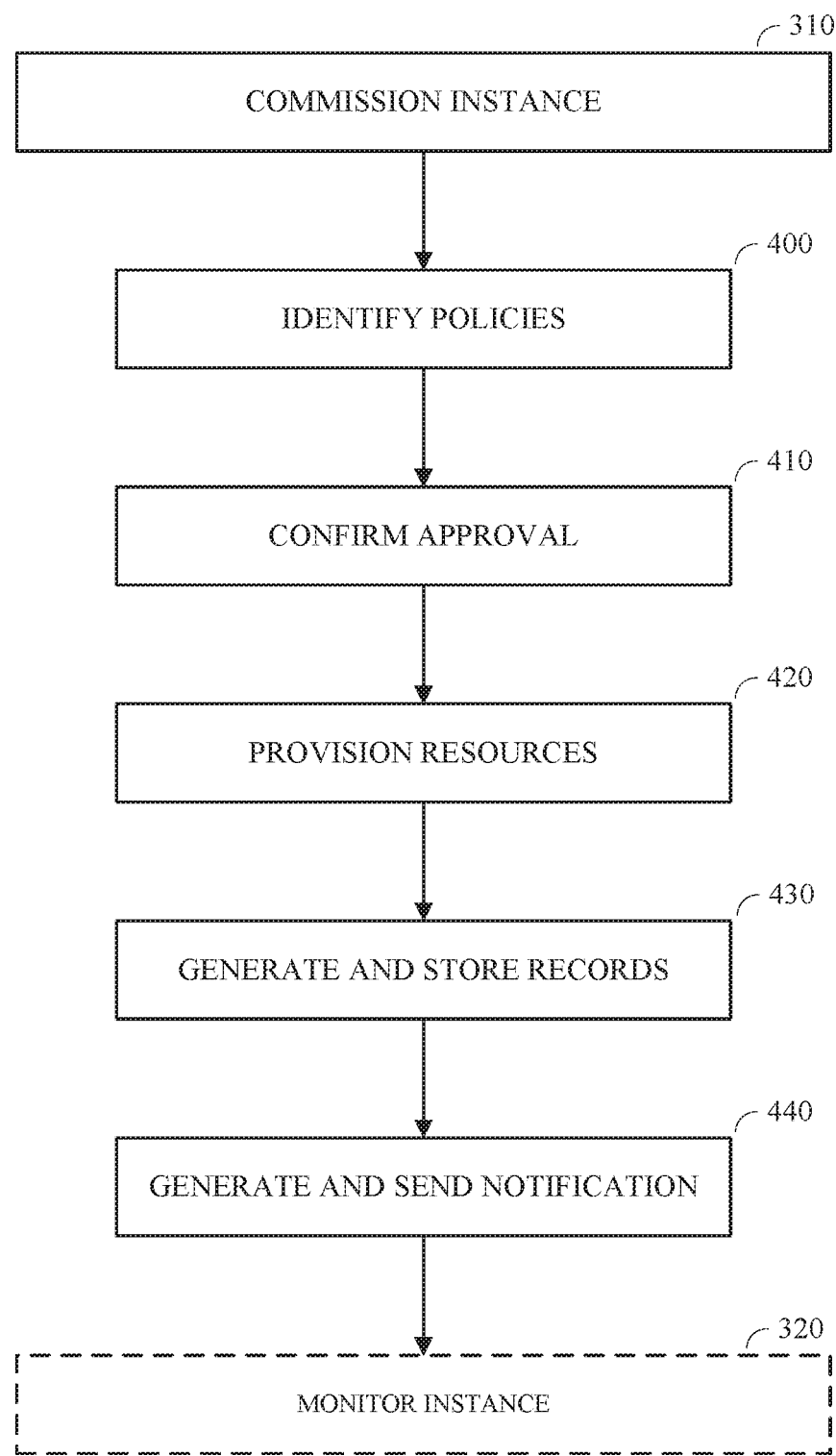
FIG. 4 is a flowchart illustrating an example of instance commissioning in accordance with this disclosure.

The instance may be commissioned at 310, as shown in FIG. 4. For example, commissioning an instance may include identifying policies, confirming approval, provisioning cloud computing system resources, generating and storing classification based automated instance management system information representing the instance, or a combination thereof.

Figure 5:
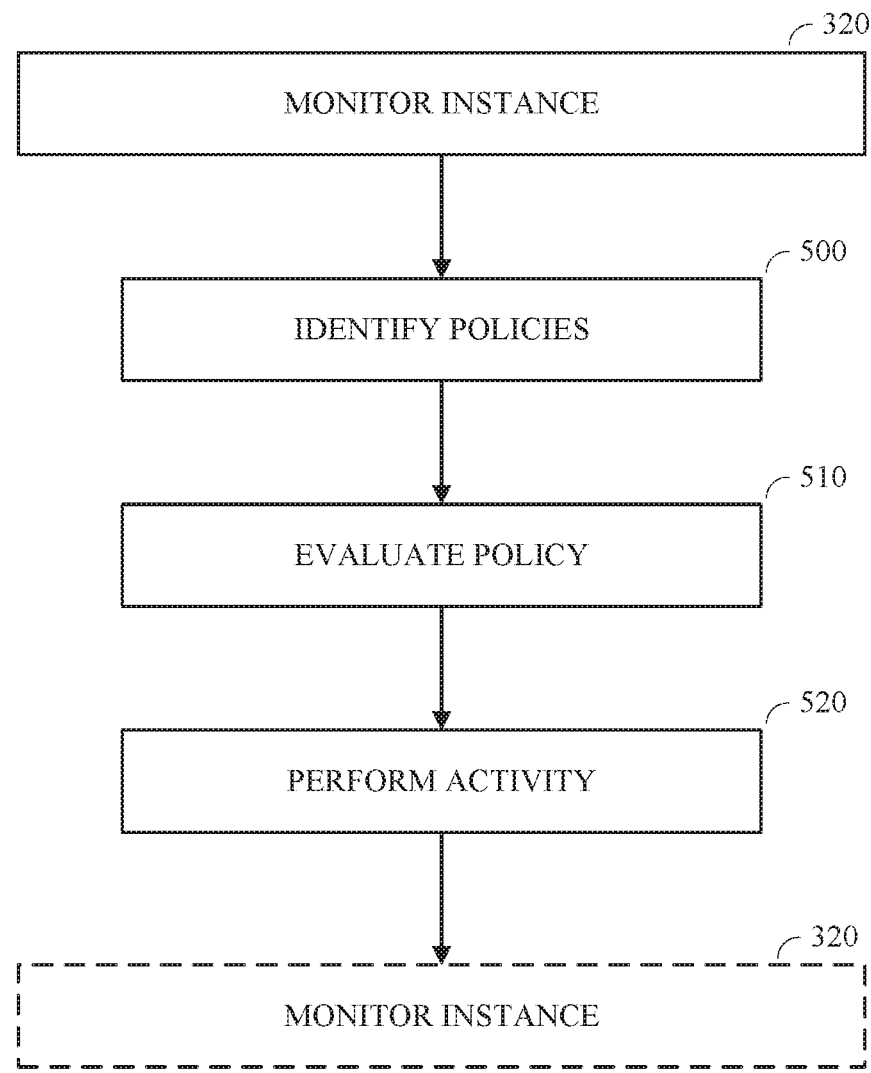
FIG. 5 is a flowchart illustrating an example of automated instance monitoring in accordance with this disclosure.

An instance may be automatically monitored at 320, as shown in FIG. 5. For example, automatically monitoring an instance may include automated customer support activities, automated resource monitoring, automated backup, automated instance lifecycle management, or a combination thereof.

Figure 7:
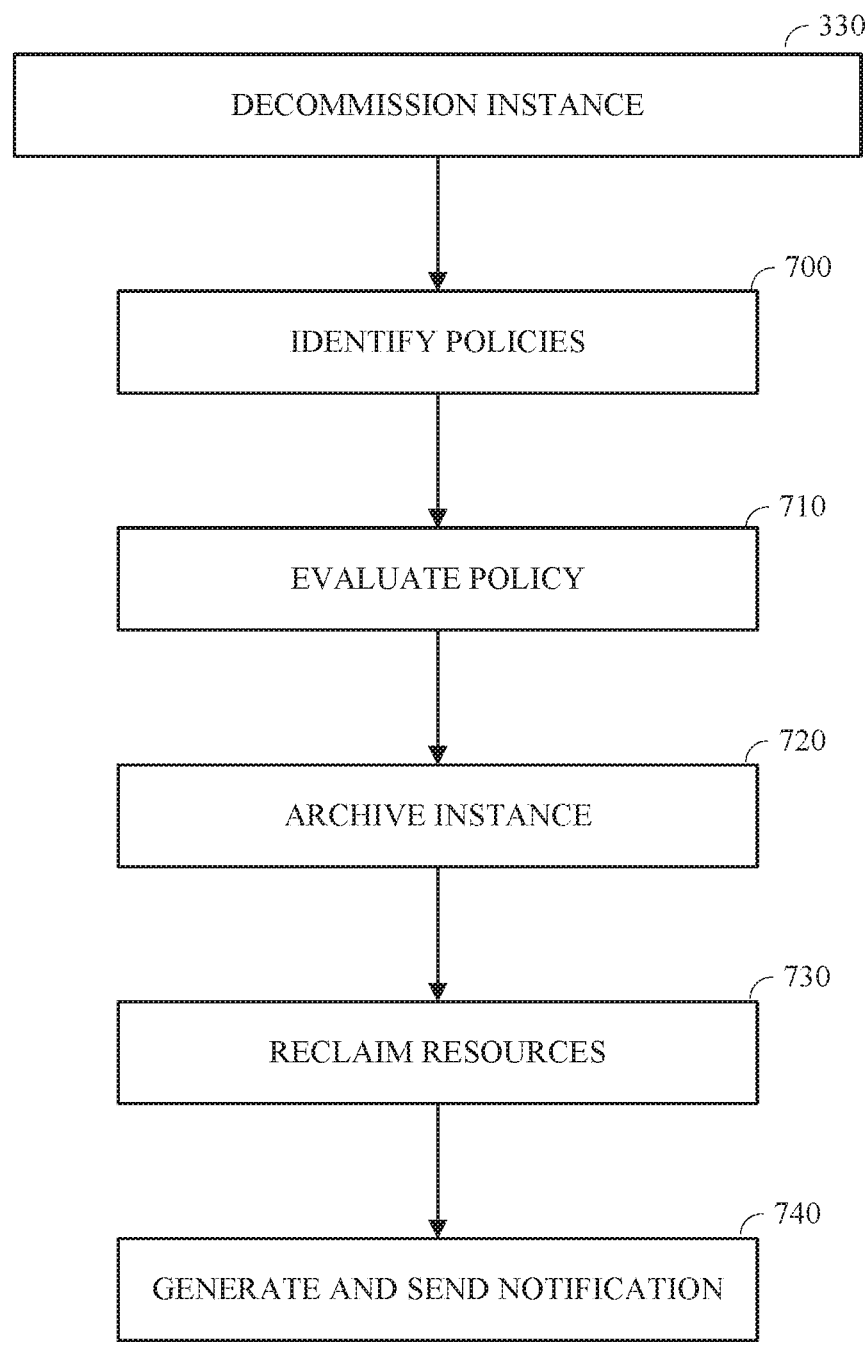
FIG. 7 is a flow chart illustrating an example of automated instance decommissioning in accordance with this disclosure.

An instance may be automatically decommissioned at 330, as shown in FIG. 7. For example, automatically decommissioning an instance may include identifying and evaluating policies, archiving the instance, reclaiming resources, generating and sending notifications, or a combination thereof.

FIG. 4 is a flowchart illustrating an example of instance commissioning 310 in accordance with this disclosure. Commissioning an instance may be performed in response to generating or receiving a request to commission an instance and may include identifying policies at 400, confirming approval at 410, provisioning cloud computing system resources at 420, generating and storing classification based automated instance management system information representing the instance at 430, generating and sending notifications at 440, or a combination thereof.

Classification based automated instance management policies may be automatically identified at 400. For example, one or more classification based automated instance management policies may be identified by examining the CMDB based on the parameters indicated in the request.

Identifying policies at 400 may include determining resource allocations for the instance. Resource allocations may identify defined hardware configuration parameters, defined software configuration parameters, defined system configuration parameters, defined data configuration parameters, or any other information that may be used to automatically configure an instance.

Resource allocations may identify processor attributes for an instance, such as a number, quantification, or count of processors, a type of processor, a capability of a processor, or a portion of one or more processors, such as a number of clock cycles per unit time. Resource allocations may identify a defined processor. For example, a resource allocation may identify a SKU representing a defined processor, or an inventory control identifier representing a defined processor.

Resource allocations may identify volatile memory, such as random access memory (RAM), attributes for an instance, such as a number, quantification, or amount of volatile memory space, a type of volatile memory, or a capability of volatile memory. Resource allocations may identify a defined memory unit. For example, a resource allocation may identify a SKU representing a defined memory unit, or an inventory control identifier representing a defined memory unit.

Resource allocations may identify storage or disk space attributes for an instance, such as a number, quantification, or amount of disk space, a type of disk space, or a disk capability, such as read time, write time, or redundancy. Resource allocations may identify a defined disk unit. For example, a resource allocation may identify a SKU representing a defined disk unit, or an inventory control identifier representing a defined disk unit.

Resource allocations may identify network attributes for an instance, such as a number, quantification, or amount of communication bandwidth, an address, address space, or domain, or a network capability, such as response time, availability, configuration, or the like. Resource allocations may identify a defined network attribute, such as a defined URL.

Resource allocations may identify software for an instance, such as an operating system type, version, or configuration, a web server type, version, or configuration, a database server type, version, or configuration. A resource allocation may identify a virtual machine type, version, or configuration. A resource allocation may identify a defined host system. For example, resource allocations may identify a virtual machine and a physical server to host the virtual machine. In another example, resource allocations may identify a defined web server to host a web component of the application instance and a defined database server to host a database for the instance.

Resource allocations may be relative in nature. For example, a resource allocation may indicate that an instance should be allocated to available hardware or racks that are older or not as capable (e.g., for an instance that is less critical, such as an employee instance) or that an instance should be allocated to available hardware or racks that are newer or more capable (e.g., for an instance that is critical, such as a sales demonstration instance). For example, available resources can be ranked by one or more criteria, such as processing power, memory, storage space, and/or age, and the resource allocation can indicate that an instance should be assigned in order of the ranking or within a certain percentile of the ranking (e.g., to hardware in the 20th percentile of processing power).

In some implementations, identifying policies at 400 may include identifying approval policies for the requested instance. For example, one or more approval policies may be identified by evaluating the classification based automated instance management data based on the parameters indicated in the request. An approval policy may indicate an approval required for commissioning the requested instance, and may indicate one or more approval entities associated with the approval. An approval entity may be a user or a user role. For example, the approval entity may be a user identifier for a user that is a manager or supervisor of the user indicated as the owner of the instance. In another example, the owner may be a customer and the approval entities may include internal users associated with the customer, such as an account representative, a manager of the account representative, and a director of the manager. In some implementations, the classification based automated instance management data may include information describing approval relationships between users or user roles.

Approval of the request may be automatically confirmed at 410 based on the approval polices identified at 400. For example, confirming the approval may include evaluating the classification based automated instance management data to identify a record indicating approval for the request. In some implementations, an approval may be generated automatically or may be omitted. For example, a user may be identified as an approver for the request, and confirming the approval may include determining that automatic approval is defined for the user, or for a user role associated with the user. In some implementations, an approval record associated with an approval entity for the instance may be unavailable, and commissioning the instance may be delayed. For example, the classification based automated instance management system may periodically determine whether the request is approved, or may determine whether the request is approved in response to an event, such as receiving or storing an approval record. In some implementations, a request may be denied and commissioning the instance may be terminated.

Cloud computing system resources may be provisioned at 420 based on the resource allocations identified at 400. Provisioning cloud computing resources may include reserving resources, acquiring resources, creating resources, distributing resources, configuring resources, deploying resources, or any other activities associated with providing resources for an instance. For example, generating or provisioning an instance at 420 may include installing software on a device, such as a server, configuring hardware or software, storing data, such as application data and files, or a combination thereof. In some implementations, provisioning the instance at 420 may include creating a virtual machine on a server. In some implementations, provisioning the instance at 420 may include generating and storing routing information for the instance.

Classification based automated instance management system information representing the instance may be automatically generated and stored at 430. Generating and storing classification based automated instance management information at 430 may include generating information, such as records, representing the instance and storing the record in the classification based automated instance management database or configuration file, which may include the CMDB.

Notifications regarding the instance may be automatically generated and sent at 440 based on the policies identified at 400. For example, a notification may be sent to the instance owner, an approver of the request, the assignment group, or a combination thereof. In some implementations, the classification based automated instance management policies may indicate that an instance is configured to expire automatically. For example, the classification based automated instance management data may indicate a duration for the instance, which may indicate a period, such as a number of days, from the date the instance is commissioned, after which the instance will be automatically decommissioned. In another example, the classification based automated instance management data may indicate an expiration event for the instance. For example, an instance associated with a user may be configured to automatically expire in response to a change of a status of the user to inactive. In some implementations, the classification based automated instance management data may indicate a combination of an expiration event and a duration. For example, an instance may be configured to automatically expire after 60 days of inactivity. The notification may indicate the duration for the instance, an expiration date determined based on the duration, an expiration event, or a combination thereof.

FIG. 5 is a flowchart illustrating an example of automated instance monitoring 320 in accordance with this disclosure. Automated instance monitoring may include identifying automated instance monitoring policies at 500, evaluating the policies at 510, performing one or more automated instance monitoring activities at 520, or a combination thereof.

Automated instance monitoring 320 may include continuous monitoring, periodic monitoring, or a combination thereof. For example, the classification based automated instance management system may include one or more scheduled monitoring jobs, which may be scheduled to execute periodically, such as daily. Continuous instance monitoring may include performing a defined activity in response to an event, a trigger, or a condition. Periodic instance monitoring may include periodically evaluating instances, such as each instance identified in the classification based automated instance management data. In some implementations, the classification based automated instance management data may indicate that an instance is decommissioned, and monitoring for the instance may be limited to decommissioned instance monitoring, or omitted.

Automated instance monitoring policies may be identified at 500. Identifying automated instance monitoring policies may include identifying instances defined in the classification based automated instance management data and identifying classification based automated instance management policies for the instances. In some implementations, the automated monitoring activities for an instance may be determined by examining the classification based automated instance management data to identify policies associated with the instance. For example, the classification based automated instance management system may automatically examine the classification based automated instance management data to identify classification based automated instance management policies for an instance.

The policies identified at 500 may be evaluated at 510. Evaluating the policies may include identifying one or more automated instance monitoring activities, such as automated customer support activities, automated resource monitoring, automated backup, automated instance lifecycle management, or a combination thereof. Evaluating the policies may include determining whether to perform one or more of the identified activities based on defined instance information, current instance state information, and the identified policies.

One or more of the identified automated instance monitoring activities may be performed at 520 based on the determination at 510. In some implementations, classification based automated instance management may include communicating with one or more external systems. For example, automated monitoring may include identifying a policy that indicates an external computing system for performing a defined instance management activity, and the classification based automated instance management system may communicate with the external computing system to perform the defined instance management activity.

In an example, the policies may indicate automated support for an instance. The identified policies may identify reporting criteria, which may include a user or user role as a defined recipient for automated support notifications, and classification based automated instance management may include automatically generating and sending support notifications to the identified user based on the identified reporting criteria.

In another example, the policies may indicate an amount or type of resource monitoring for an instance. For example, classification based automated instance management policies may indicate a monitoring frequency, may indicate components of an instance to monitor, may indicate whether to monitor usage, may indicate whether to monitor resource availability and usage for the instance, or may indicate any other type of instance monitoring, and classification based automated instance management may include automatically monitoring the instance based on the identified policies.

In another example, the policies may indicate frequency, retention period, size, or redundancy for backing up an instance, and classification based automated instance management may include automatically backing up the instance based on the identified policies.

Figure 6A:
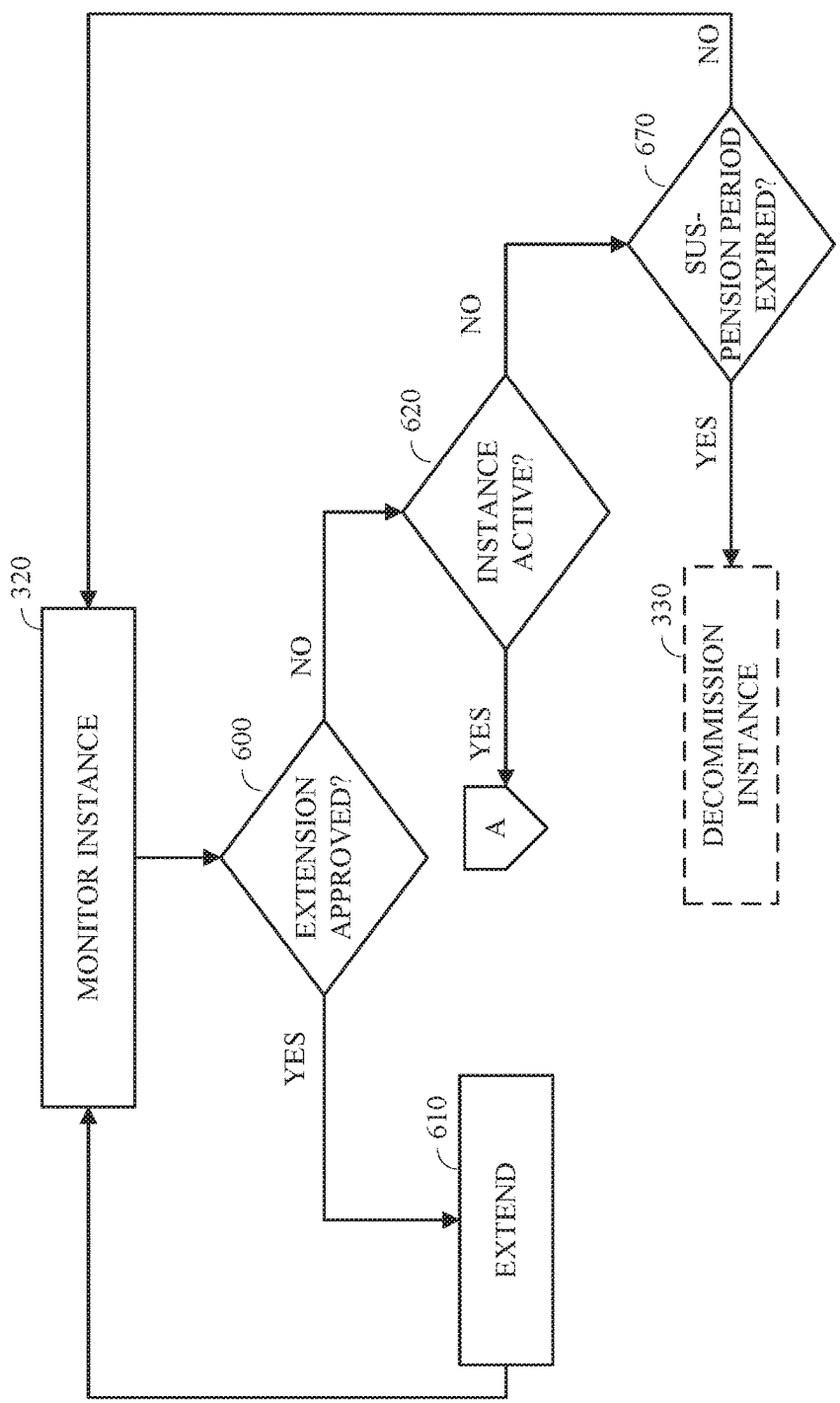
FIGS. 6A and 6B together constitute a flowchart illustrating an example of automated instance lifecycle monitoring and management in accordance with this disclosure.
Figure 6B:
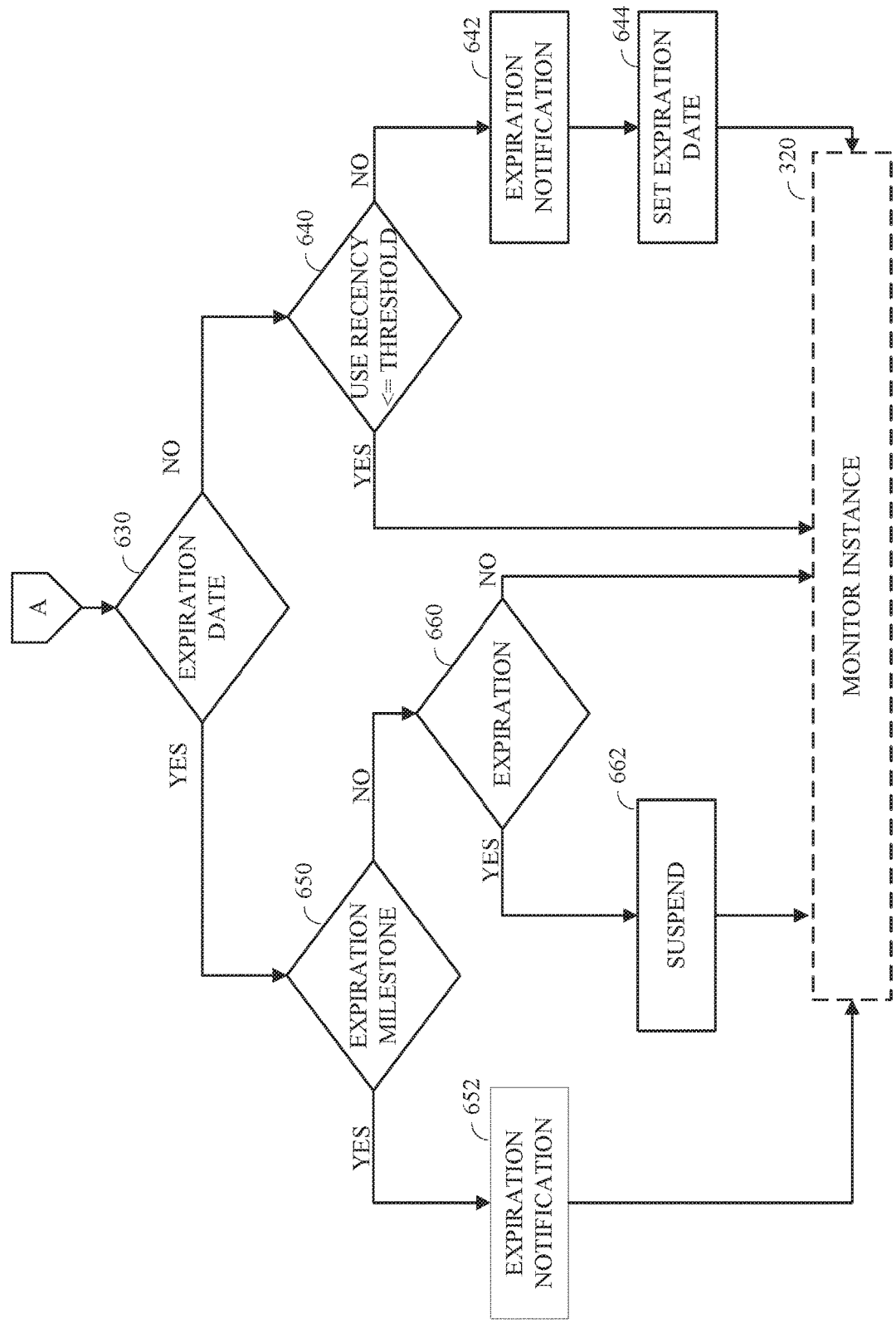

In another example, the policies may indicate parameters for performing automated lifecycle monitoring and management, and classification based automated instance management may include automatically performing automated lifecycle monitoring and management, as shown in FIGS. 6A and 6B.

FIGS. 6A and 6B together constitute a flowchart illustrating an example of automated instance lifecycle monitoring and management in accordance with this disclosure. Automated instance lifecycle monitoring and management may include identifying an approved extension at 600, extending the instance at 610, determining whether an instance is active at 620, identifying an expiration date for the instance at 630, determining recency of use at 640, determining whether an expiration milestone is current at 650, determining whether the instance is expired at 660, determining whether a suspension period is expired at 670, or a combination thereof.

An approved extension determination may be performed at 600. Although not shown separately in FIGS. 6A-6B, determining whether an extension is approved for the instance at 600 may include performing an extension request procedure. An extension request procedure may include generating a request to extend an instance, notifying an approval entity regarding the request, recording information indicating whether the request is approved, or a combination thereof. In some implementations, an extension request may be generated using an extension request interface. For example, an expiration notice may indicate a link to an extension request interface or a user may attempt to access a suspended instance and the user may access a placeholder instance, which may include a link to the extension request interface, and the extension request may be generated and submitted via the extension request interface.

The extension request procedure may include generating and submitting an extension request. An extension request may include an identifier for the instance, a name of the instance, an owner of the instance, an assignment group associated with the instance, a current expiration date for the instance, an extension justification, or a combination thereof. In response to generating and submitting the extension request, an extension approval procedure may be performed. The extension approval procedure may include storing information indicating whether the extension request is approved. In some implementations, the extension approval procedure may include determining whether an extension is available for the instance and may include automatically indicating that the extension request is denied in response to determining that there are no available extensions for the instance. The extension approval procedure may include generating and sending an extension request response notification indicating whether the request has been approved or denied. Target recipients for the notification may be identified based on the classification based automated instance management data. For example, the notification may be sent to the owner, the requestor, the assignment group, or a combination thereof, as indicated by the classification based automated instance management data.

The approved extension determination at 600 may indicate that an extension request for the instance is approved, the instance may be extended at 610, and the system may continue to monitor the instance at 320. Extending the instance at 610 may include updating an expiration date for the instance based on the approved extension duration as indicated in the classification based automated instance management data.

In some implementations, an approved extension may be identified for a suspended instance at 600, and extending the instance at 610 may include adding, modifying, or deleting one or more records, such as records in a classification based automated instance management database, to indicate that the instance is active. For example, the classification based automated instance management database may include records indicating a status of the instance, and the status may be updated to "active" or "operational". In some implementations, network address information may be modified to indicate that the instance is active. Modifying the network address may include adding, deleting, or modifying network routing, naming, or address translation records, such as domain name system (DNS) records. In some implementations, the IP address of the suspended instance may be marked as active, or may be added to one or more routing or IP address management tables or systems.

Extending a suspended instance at 610 may include generating and sending an extension notification indicating that the instance has been extended, and indicating an updated expiration date for the instance. Target recipients for the notification may be identified based on the classification based automated instance management data. For example, the notification may be sent to the owner, the approvers, the assignment group, or a combination thereof, as indicated by the classification based automated instance management data.

The approved extension determination at 600 may not identify a request for extension for the instance, may determine that any current requests for extension are denied, or may determine that there are no available extensions for the instance, and a status of the instance may be identified at 620, which may include determining whether the instance is active, inactive, suspended, or decommissioned. For example, the classification based automated instance management data may include information indicating the status of the instance. In some implementations, monitoring for a decommissioned instance may be omitted.

The status of the instance may be identified as active at 620, and an expiration date may be identified at 630. Automated instance lifecycle monitoring and management may include determining expiration information for an instance, such as an expiration period or duration, a number of available extensions, an extension duration, or a combination thereof. For example, the expiration information may be determined by examining defined classification based automated instance management data, such as data stored in a database table or a configuration file. Table 1 shows an example of defined classification based automated instance management duration data.

TABLE 1

Defined Classification Based Automated Instance Management Duration Data

| Internal/External | Type | Duration | Extensions | Extension Duration |
|---|---|---|---|---|
| External | Customer | 90 days | 3 | 30 days |
| External | Partner | 90 days | 3 | 30 days |
| External | Developer | 90 days | 0 | 0 |
| Internal | Employee | 90 days | 1 | 90 days |
| Internal | Training-Single Use | 90 days | 1 | 90 days |
| Internal | Development | 90 days | 1 | 90 days |
| Internal | Marketing | Ongoing | N/A | N/A |
| Internal | Sales | Ongoing | N/A | N/A |
| Internal | Solution Consultant | Ongoing | N/A | N/A |
| Internal | Info Doc | Ongoing | N/A | N/A |
| Internal | RSA | Ongoing | N/A | N/A |
| Internal | Support | Ongoing | N/A | N/A |
| Internal | Training-Ongoing | Ongoing | N/A | N/A |
| Internal | Expert Services | Ongoing | N/A | N/A |
| Internal | QA | Ongoing | N/A | N/A |

In some implementations, identifying an expiration date at 630 may include identifying an expiration type for the instance. An instance expiration type may be identified based on the instance environment, the instance type, or a combination thereof, as shown in Table 1.

For example, the instance may be identified as having an expiration type of "ongoing", indicating an event based expiration type. An ongoing instance may be an instance for which a defined duration is not specified, is specified as ongoing, or is specified using a defined ongoing duration value, such as zero. For example, Table 1 above indicates a "Training-Ongoing" instance type, for which a defined duration is specified as ongoing. Although not shown in Table 1, the classification based automated instance management data may indicate a duration associate with an event based expiration type. For example, the classification based automated instance management data may indicate that an instance will expire a defined temporal threshold, such as 60 days, after a defined event, such as a recency of use.

In another example, the instance may be identified as having a temporal expiration type. A temporal expiration type instance may be an instance for which a defined duration is specified. For example, Table 1 above indicates a "Training-Single Use" instance type that has a defined duration specified.

The expiration date determination at 630 may not identify a defined expiration date for the instance and may determine that the instance is an ongoing instance, and the instance may be evaluated to determine recency of use at 640. Determining recency of use at 640 may include determining a most recent use of the instance, such as a most recent request for information, such as a web page, from the instance, or a most recent successful login to the instance. For example, a system log associated with the instance may be evaluated and a most recent request to use or access the application instance may be identified. The most recent use may be evaluated to determine whether it is within a defined ongoing instance recency threshold, such as 60 days. For example, a difference between the current date and the most recent use may be less than or equal to the defined ongoing instance recency threshold, and the system may continue to monitor the instance at 320. In another example, the difference between the current date and the most recent use may be greater than the defined ongoing instance recency threshold, an ongoing instance expiration notification may be generated at 642, an expiration date may be determined and stored at 644, and the system may continue to monitor the instance at 320.

Generating an ongoing instance expiration notification at 642 may include generating and sending a notification indicating automatic expiration of the ongoing instance after a defined ongoing instance automatic expiration period, such as 15 days. The notification may include instructions for requesting an extension of the ongoing instance, which may include a link to an extension request form or page. In some implementations, generating the ongoing instance expiration notification at 642 may be omitted if the difference between the current date and the most recent use is greater than one day larger than the defined ongoing instance use duration threshold, or may be omitted in response to determining that an ongoing instance expiration notification for the current expiration period was previously sent. Target recipients for the notification may be identified based on the classification based automated instance management data. For example, the notification may be sent to the owner, the approvers, the assignment group, or a combination thereof, as indicated by the classification based automated instance management data.

An expiration date for the instance may be determined and stored at 644. The expiration date may be the sum of the current date and the defined ongoing instance automatic expiration period as indicated in the ongoing instance expiration notification generated at 642. Storing the expiration date may include generating and storing a record indicating the expiration date in the classification based automated instance management data. In some implementations, generating the ongoing instance expiration notification at 642 may include generating and storing a record indicating the date the ongoing instance expiration notification was sent in the classification based automated instance management data, and storing the expiration date at 644 may be omitted. In some implementations, generating the ongoing instance expiration notification at 642 may be performed on the date that the recency of use reaches the recency of use threshold, and storing the expiration date at 644 may be omitted.

In some implementations, the expiration date determination at 630 may indicate that the instance is an ongoing expiration type instance and may indicate that an expiration date is identified for the instance. For example, the classification based automated instance management data may include an indication of an expiration date for the ongoing instance. In another example, the expiration date determination at 630 may determine that a defined ongoing instance recency threshold has been met or that a notification indicating that the defined ongoing instance recency threshold has been met has been sent, and the expiration date may be identified based on the date that the defined ongoing instance recency threshold was met or the date the notification indicating that the defined ongoing instance recency threshold has been met was sent.

The expiration date determination at 630 may indicate that the instance is a temporal expiration type instance and the instance may be evaluated to determine whether a defined expiration milestone has been reached at 650. A defined expiration milestone may indicate a period, which may be a number of days, such as 1 day, 5 days, 15, or any other period, between a current date and an expiration date for the instance. The expiration date for the instance may be determined based on the commissioning date for the instance, the duration for the instance, the number of approved extensions for the instance, and the duration for each approved extension, which may be identified based on the instance classification metrics, as shown in Table 1 above. For example, the expiration date may be the sum of the commissioning date for the instance and the duration for the instance. In some implementations, the classification based automated instance management data may define expiration milestones corresponding to the classification metrics.

The milestone determination at 650 may indicate that a defined expiration milestone has been reached, and an instance expiration notification may be generated at 652. Generating an instance expiration notification at 652 may include generating and sending a notification indicating automatic expiration of the instance after a period corresponding to the defined expiration milestone. For example, the defined milestone may be a 5-day milestone, which may indicate that the instance is 5 days from automatic expiration. The notification may include an indication of the defined expiration milestone, and may include instructions for requesting an extension of the instance, which may include a link to an extension request form or page. In some implementations, generating the instance expiration notification at 652 may be omitted if the difference between the current date and the most recent use is greater than one day larger than the defined expiration milestone, or may be omitted in response to determining that an instance expiration notification for the defined expiration milestone was previously sent. Target recipients for the notification may be identified based on the classification based automated instance management data. For example, the notification may be sent to the owner, the approvers, the assignment group, or a combination thereof, as indicated by the classification based automated instance management data.

The milestone determination at 650 may indicate that the current date differs from the defined expiration milestones for the instance, or may determine that a pending expiration milestone is not specified, and the instance may be evaluated to determine whether the instance has expired at 660. The expiration determination may indicate that the instance has expired, and the instance may be suspended at 662.

Suspending an instance at 662 may include maintaining the instance configuration and operation, including instance monitoring at 320, except as described herein. Suspending an instance may include adding, modifying, or deleting one or more records, such as records in classification based automated instance management database, to indicate that the instance is suspended. For example, the classification based automated instance management database may include records indicating a status of the instance, and the status may be updated to "suspended". In some implementations, network address information may be modified to indicate that the instance is suspended. Modifying the network address may include adding, deleting, or modifying network address routing, naming, or address translation records, such as DNS records. In some implementations, the IP address of the suspended instance may be marked as suspended, or may be deleted from one or more routing or IP address management tables or systems.

Suspending an instance may include generating and sending a suspended instance notification indicating that the instance has been automatically suspended, and indicating that the instance will be decommissioned after a defined period, such as 14 days. The notification may include may include instructions for requesting restoration and extension of the instance, which may include a link to an extension request form or page. Target recipients for the notification may be identified based on the classification based automated instance management data. For example, the notification may be sent to the owner, the approvers, the assignment group, or a combination thereof, as indicated by the classification based automated instance management data.

Suspending an instance may include providing a suspended instance placeholder. For example, a defined web server may host a suspended instances page, site, or application, and may be configured to present information indicating that the instance has been suspended and to provide information for extending the instance, such as a link to an instance extension form, and the IP address of the suspended instance may be replaced with the IP address of the suspended instances site in the DNS records.

The status of the instance may be identified as suspended at 620, a determination whether a suspension duration has expired may be performed at 670. The suspended period expired determination at 670 may determine whether the instance has been suspended for a defined suspension duration. The suspended period expired determination at 670 may indicate that the instance has been suspended for less than the defined period, and the system may continue to monitor the instance at 320. The suspended period expired determination at 670 may indicate that the instance has been suspended for the defined period, and the instance may be retired or decommissioned, as shown in FIG. 7.

FIG. 7 is a flowchart illustrating an example of automated instance decommissioning 330 in accordance with this disclosure. Automated instance decommissioning may include identifying automated instance decommissioning policies at 700, evaluating the policies at 710, archiving the instance at

720, reclaiming resources at 730, generating and sending a decommissioned instance notification at 740, or a combination thereof.

Automated instance decommissioning policies may be identified at 700. Identifying automated instance decommissioning policies may include identifying policies defined in the classification based automated instance management data based on instance classification metrics. In some implementations, the automated monitoring activities for an instance may be determined by examining the classification based automated instance management data to identify policies associated with the instance.

The policies identified at 700 may be evaluated at 710. Evaluating the policies may include identifying one or more automated instance decommissioning activities, such as automated archival, automated resource reclamation, automated decommissioning notification, or a combination thereof. Evaluating the policies may include determining whether to perform one or more of the identified activities based on defined instance information, current instance state information, and the identified policies.

The instance may be automatically archived at 720. Automatically archiving the instance may include generating a backup of the instance for storage in an online backup system or at an offline backup facility. Automatically arching the instance may include adding, modifying, or deleting one or more records, such as records in the classification based automated instance management database, to indicate that the instance is retired or decommissioned. For example, the classification based automated instance management database may include records indicating a status of the instance, and the status may be updated to "retired". In some implementations, network address information may be modified to indicate that the instance is decommissioned. Modifying the network address may include adding, deleting, or modifying network routing, naming, or address translation records, such as DNS records. In some implementations, the IP address of the suspended instance may be marked as decommissioned, or may be deleted from one or more routing or IP address management tables or systems.

Resources utilized by the instance may be automatically reclaimed at 730. Reclaiming resources may include deleting instance data from data storage systems, removing records associated with the data from one or more databases, updating records in the classification based automated instance management data, or in an external system, such as an inventory tracking system, to indicate that the resources are available or unassigned.

A decommissioned instance notification may be generated and sent at 740. The decommissioned instance notification may indicate that the instance has been automatically decommissioned. Target recipients for the notification may be identified based on the classification based automated instance management data. For example, the notification may be sent to the owner, the approvers, the assignment group, or a combination thereof, as indicated by the classification based automated instance management data.

All or a portion of implementations of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The implementations herein may be described in terms of functional block components and various processing operations. Such functional blocks may be realized by any number of hardware and/or software components that perform the specified functions. For example, the described implementations may employ various integrated circuit components, e.g., memory elements, processing elements, logic elements, look-up tables, and the like, which may carry out a variety of functions under the control of one or more microprocessors or other control devices. Similarly, where the elements of the described implementations are implemented using software programming or software elements the invention may be implemented with any programming or scripting language such as C, C++, Java, assembler, or the like, with the various algorithms being implemented with any combination of data structures, objects, processes, routines or other programming elements. Functional implementations may be implemented in algorithms that execute on one or more processors. Furthermore, the implementations of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

The word "example" is used herein to mean serving as an example, instance, or illustration. Any implementation or design described herein as "example" is not necessarily to be construed as preferred or advantageous over other implementations or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect, or implementation unless described as such.

The particular implementations shown and described herein are illustrative examples of the invention and are not intended to otherwise limit the scope of the invention in any way. For the sake of brevity, conventional electronics, control systems, software development and other functional implementations of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described implementations have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

monitoring a plurality of commissioned computer instantiated application instances based on a classification metric and a policy, each application instance of the plurality of application instances being either an internal instance or an external instance, wherein each application instance of the plurality of application instances is associated with a corresponding classification metric indicative of whether the respective application instance is an internal instance or external instance, wherein the policy corresponds to a customer account, wherein the plurality of application instances is hosted by one or more data centers and is configured to run an application accessible on one or more remote client networks, and wherein monitoring the plurality of application instances comprises:

determining that an extension for the respective application instance has not been approved based on the classification metric, the policy, or both;

determining that the respective application instance is not active; and determining that the respective application instance has been suspended for a respective suspension period, and that the respective suspension period has expired; and decommissioning the respective application instance in response to determining that:
the extension for the respective application instance has not been approved;
the respective application instance is not active; and
the respective suspension period for the respective application instance has expired, and wherein decommissioning the respective application instance comprises identifying and evaluating one or more decommissioning policies determined based on the classification metric associated with the respective application instance.

2. The method of claim 1, wherein monitoring the plurality of application instances comprises determining that a recency of use exceeds a threshold recency of use value, determining an expiration period, determining a duration, determining a number of available extensions, or determining an extension duration, or a combination thereof.

3. The method of claim 2, wherein decommissioning the respective application instance comprises decommissioning the respective application instance in response to determining that the recency of use exceeds the threshold recency of use value.

4. The method, as set forth in claim 1, wherein the classification metric is indicative of an operational environment for each application instance of the plurality of application instances, or an operational type for each application instance of the plurality of application instances, or a combination thereof.

5. The method, as set forth in claim 1, wherein the classification metric comprises:
a first classification metric classifying the respective application instance based on a production environment, a sub-production environment, or a demonstration environment;
a second classification metric classifying the respective application instance based on a type of application instance, wherein the type of application instance comprises training, development, marketing, or sales, or a combination thereof; or
a third classification metric classifying the respective application instance based on the policy corresponding to the customer account.

6. The method, as set forth in claim 1, wherein decommissioning the respective application instance comprises:
archiving the respective application instance, wherein archiving comprises generating a backup of the respective application instance for storage in an online backup system or at an offline backup facility; and
reclaiming resources utilized by the respective application instance, wherein reclaiming comprises deleting application instance data from one or more data storage systems, removing records associated with the application instance data from one or more databases, and updating an inventory tracking system to indicate that the resources are available or unassigned.

7. A system, comprising:
one or more hardware processors; and
a non-transitory memory, the non-transitory memory storing instructions that, when executed by the one or more hardware processors, causes the one or more hardware processors to perform operations comprising:
monitoring a plurality of commissioned computer instantiated application instances based on a classification metric and a policy, each application instance being either an internal instance or an external instance, wherein each application instance of the plurality of application instances is associated with a corresponding classification metric indicative of whether the respective application instance is an internal instance or external instance, wherein the policy corresponds to a customer account, wherein the plurality of application instances is hosted by one or more data centers and is configured to run an application accessible on one or more remote client networks, and wherein monitoring the plurality of application instances comprises:
determining that an extension for the respective application instance has not been approved based on the classification metric, the policy, or both;
determining that the respective application instance is not active; and
determining that the respective application instance has been suspended for a respective suspension period, and that the respective suspension period has expired;
determining that a recency of use exceeds a threshold recency of use value; and
decommissioning the respective application instance in response to determining that:
the extension for the respective application instance has not been approved;
the respective application instance is not active;
the respective suspension period for the respective application instance has expired; and
the recency of use exceeds the threshold recency of use value, and wherein decommissioning the respective application instance comprises identifying and evaluating one or more decommissioning policies determined based on the classification metric associated with the respective application instance.

8. The system of claim 7, wherein monitoring the plurality of application instances comprises determining an expiration period, a duration, a number of available extensions, an extension duration, or a combination thereof.

9. The system of claim 7, wherein the classification metric is indicative of an operational environment for each application instance of the plurality of application instances, or an operational type for each application instance of the plurality of application instances, or a combination thereof.

10. The system of claim 7, wherein the classification metric comprises an indication classifying each application instance of the plurality of application instances based on a production environment, a sub-production environment, or a demonstration environment, or a combination thereof.

11. The system of claim 7, wherein decommissioning the respective application instance comprises:
archiving the respective application instance, wherein archiving comprises generating a backup of the respective application instance for storage in an online backup system or at an offline backup facility; and
reclaiming resources utilized by the respective application instance, wherein reclaiming comprises deleting application instance data from one or more data storage systems, removing records associated with the application instance data from one or more databases, and updating an inventory tracking system to indicate that the resources are available or unassigned.

12. The system of claim 7, wherein the classification metric comprises an indication classifying the respective application instance based on a type of application instance, wherein the type of application instance comprises training, development, marketing, or sales, or a combination thereof.

13. The system of claim 7, wherein the classification metric comprises an indication classifying the respective application instance based on the policy corresponding to the customer account.

14. The system of claim 7, wherein the policy comprises:
a first policy indicating that an approval is required for commissioning the respective application instance; and
a second policy defining one or more entities authorized to make the approval.

15. The system of claim 7, wherein the policy comprises a reporting schedule to provide one or more users automated support notifications regarding the respective application instance, wherein the operations comprise:
identifying the reporting schedule; and
generating and sending automated support notifications based on the reporting schedule.

16. The system of claim 7, wherein the policy comprises one or more of:
a first policy defining frequency to monitor the respective application instance;
a second policy defining components of the respective application instance to monitor;
a third policy indicative of whether to monitor usage;
a fourth policy indicative of whether to monitor resource availability; and
a fifth policy indicative of a size associated with backing up the respective application instance.

17. A non-transitory computer readable medium comprising computer readable code, that when executed by one or more processors, causes the one or more processors to perform operations comprising:
monitoring a plurality of commissioned computer instantiated application instances based on a classification metric and a policy, each application instance being either an internal instance or an external instance, wherein each application instance of the plurality of application instances is associated with a corresponding classification metric, indicative of whether the respective application instance is an internal instance or external instance, wherein the policy corresponds to a customer account, wherein the plurality of application instances is hosted by one or more data centers and is configured to run an application accessible on one or more remote client networks, and wherein monitoring the plurality of application instances comprises:
determining that an extension for the respective application instance has not been approved based on the classification metric, the policy, or both;
determining that the respective application instance is not active; and
determining that the respective application instance has been suspended for a respective suspension period, and that the respective suspension period has expired; and
decommissioning the respective application instance in response to determining that:
the extension for the respective application instance has not been approved;
the respective application instance is not active; and
the respective suspension period for the respective application instance has expired, to reclaim resources utilized by the respective application instance for another application instance, and wherein decommissioning the respective application instance comprises identifying and evaluating one or more decommissioning policies determined based on the classification metric associated with the respective application instance.

18. The non-transitory computer readable medium of claim 17, wherein monitoring the plurality of application instances comprises determining that a recency of use exceeds a threshold recency of use value.

19. The non-transitory computer readable medium of claim 17, wherein the classification metric is indicative of an operational environment for each application instance the plurality of application instances, or an operational type for each application instance of the plurality of application instances, or a combination thereof.

20. The non-transitory computer readable medium of claim 17, wherein the classification metric comprises:
a first classification metric classifying the respective application instance based on a production environment, a sub-production environment, or a demonstration environment;
a second classification metric classifying the respective application instance based on a type of application instance, wherein the type of application instance comprises training, development, marketing, or sales, or a combination thereof; or
a third classification metric classifying the respective application instance based on the policy corresponding to the customer account.

* * * * *